(12) United States Patent
Lazor et al.

(10) Patent No.: US 10,025,375 B2
(45) Date of Patent: Jul. 17, 2018

(54) AUGMENTED REALITY CONTROLS FOR USER INTERACTIONS WITH A VIRTUAL WORLD

(71) Applicant: Disney Enterprises, Inc., Burbank, CA (US)

(72) Inventors: Sara Lazor, Los Angeles, CA (US); Douglas A. Fidaleo, Canyon Country, CA (US); Michael Ilardi, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 202 days.

(21) Appl. No.: 14/872,991

(22) Filed: Oct. 1, 2015

(65) Prior Publication Data

US 2017/0097676 A1   Apr. 6, 2017

(51) Int. Cl.
| | | |
|---|---|---|
| *G06T 19/00* | (2011.01) | |
| *G06F 3/01* | (2006.01) | |
| *G06T 19/20* | (2011.01) | |
| *G09G 5/00* | (2006.01) | |
| *G02B 27/01* | (2006.01) | |

(52) U.S. Cl.
CPC .............. *G06F 3/011* (2013.01); *G06F 3/012* (2013.01); *G06F 3/013* (2013.01); *G06F 3/017* (2013.01); *G06T 19/006* (2013.01); *G06T 19/20* (2013.01); *G02B 27/017* (2013.01); *G02B 27/0172* (2013.01); *G02B 2027/014* (2013.01); *G02B 2027/0187* (2013.01); *G06T 2219/2016* (2013.01)

(58) Field of Classification Search
CPC ....... G06F 3/012; G06F 3/013; G06T 19/006; G06T 19/20; G06T 2219/2016; G06T 15/06; G02B 2027/014; G02B 2027/0187; G02B 27/017; G02B 27/0172
USPC ......................................................... 345/633
See application file for complete search history.

(56) References Cited

U.S. PATENT DOCUMENTS

| | | | |
|---|---|---|---|
| 7,394,459 B2 | 7/2008 | Bathiche | |
| 7,492,362 B2 | 2/2009 | Sakagawa | |
| 7,599,561 B2 | 10/2009 | Wilson | |
| 9,418,479 B1 * | 8/2016 | Worley, III | ........ G01B 11/2513 |
| 2004/0104935 A1 | 6/2004 | Williamson | |

(Continued)

OTHER PUBLICATIONS

Toy Car RC—Drive a Virtual Car in the Real World with Augmented RealityToywheel Official Homepage, Apr. 24, 2015, pp. 1-3.

(Continued)

*Primary Examiner* — Jin-Cheng Wang
(74) *Attorney, Agent, or Firm* — Farjami & Farjami LLP

(57) ABSTRACT

There is provided an augmented reality control for interacting with a virtual world comprising a projector, a display surface for displaying the virtual world, a physical object, a memory storing, and a processor to: project, using the projector, a user control onto the physical object including a visual representation correlated with a virtual element in the virtual world, determine a user input for controlling the virtual element based on a user manipulation of the physical object, and update, using the projector, the user control projected onto the physical object based on the user manipulation of the physical object to maintain the visual representation correlated with the virtual element in the virtual world.

16 Claims, 4 Drawing Sheets

(56) References Cited

U.S. PATENT DOCUMENTS

| | | | |
|---|---|---|---|
| 2010/0159434 A1* | 6/2010 | Lampotang | G09B 9/00 |
| | | | 434/365 |
| 2010/0253700 A1 | 10/2010 | Bergeron | |
| 2010/0315413 A1 | 12/2010 | Izadi | |
| 2012/0100911 A1 | 4/2012 | Rejen | |
| 2012/0287044 A1 | 11/2012 | Bell | |
| 2012/0295704 A1 | 11/2012 | Reiche | |
| 2013/0147711 A1 | 6/2013 | Njolstad | |
| 2014/0180972 A1 | 6/2014 | Boldyrev | |
| 2014/0184496 A1 | 7/2014 | Gribetz | |
| 2014/0300565 A1 | 10/2014 | Anderson | |
| 2014/0306866 A1 | 10/2014 | Miller | |
| 2014/0354686 A1* | 12/2014 | Mullins | G06T 19/006 |
| | | | 345/633 |
| 2015/0070347 A1 | 3/2015 | Hofmann | |
| 2016/0140764 A1* | 5/2016 | Bickerstaff | G02B 27/017 |
| | | | 345/633 |
| 2016/0307374 A1* | 10/2016 | Kurz | G06T 19/006 |

OTHER PUBLICATIONS

"PlayAnywhere: A Compact Interactive Tabletop Projection—Vision System" by: Andrew D. Wilson, UIST 2005, pp. 1-10.

\* cited by examiner

AUGMENTED REALITY CONTROLS FOR USER INTERACTIONS WITH A VIRTUAL WORLD

BACKGROUND

Interacting with a virtual world requires a user control, which is typically provided by a game controller. A game controller is a device that provides inputs and commands to a game console, typically to control an object or a character in the game. The game controller may communicate commands to the game console or a computer by means of a wired or wireless communication. Typical game controllers are keyboards, mice, gamepads, joysticks, etc. However, sometimes these conventional game controllers are not readily available to users or are not compatible with a particular game system, and impede users' interactions with the game systems.

SUMMARY

The present disclosure is directed to systems and methods for augmented reality controls for user interactions with a virtual world, substantially as shown in and/or described in connection with at least one of the figures, as set forth more completely in the claims.

DETAILED DESCRIPTION

Figure 1:
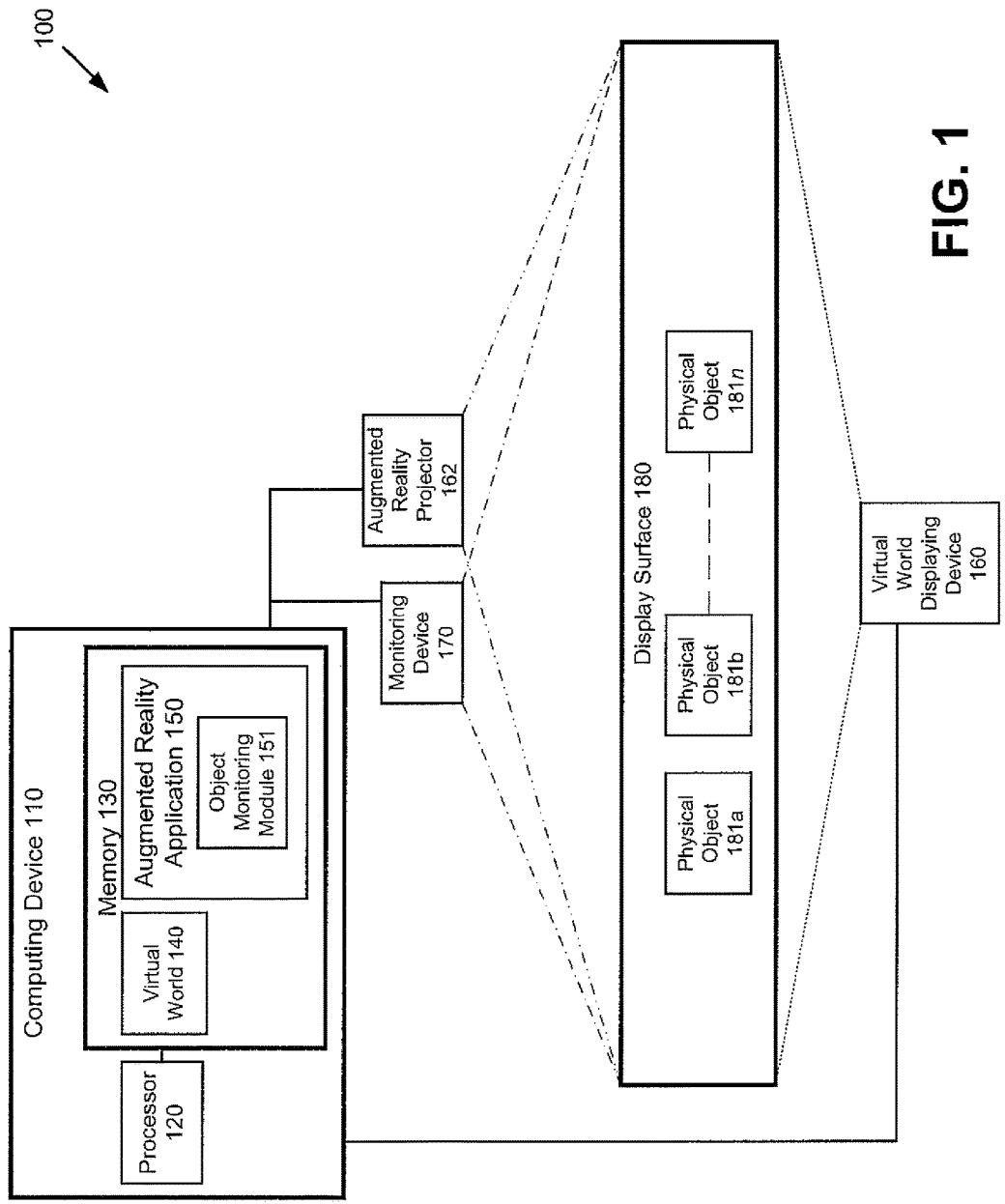
FIG. 1 shows an exemplary system providing augmented reality controls for user interactions with a virtual world, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows an exemplary system providing augmented reality controls for user interactions with a virtual world, according to one implementation of the present disclosure. System 100 includes computing device 110, virtual world displaying device 160, a projector, such as augmented reality projector 162, monitoring device 170, display surface 180, and physical objects 181a . . . 181n. Computing device 110 includes processor 120 and memory 130. Processor 120 is a hardware processor, such as a central processing unit (CPU) used in computing devices. Memory 130 is a non-transitory storage device for storing computer code for execution by processor 120, and also storing various data and parameters. Memory 130 includes virtual world 140 and augmented reality application 150.

Virtual world 140 may be a video game, an open-world video game, a sandbox game, or any other interactive digital application, and may include various settings, locations, characters, etc. In some implementations, virtual world 140 may be a virtual environment for users to interact collaboratively or competitively. Virtual world 140 may include virtual elements, such as virtual characters, virtual tools, virtual buildings, virtual vehicles, and may include an environment for virtual activities, virtual interactions, and/or virtual competitions.

Augmented reality application 150 is an executable computer code for user interaction with virtual world 140. Augmented reality application 150 may be used to combine real-world environment with virtual world 140 to create an augmented reality environment. For example, augmented reality application 150 may incorporate physical objects, such as physical object 181, in the real world into virtual world 140, or augmented reality application 150 may augment physical objects in the real world, such as physical object 181, with virtual elements of virtual world 140.

Object monitoring module 151 is an executable computer code for monitoring physical objects in an augmented reality environment. In some implementations, object monitoring module 151 may monitor a physical object or a plurality of physical objects, such as physical object 181. Object monitoring module 151 may monitor a position of physical object 181 in the real world and/or a position of physical object 181 in the virtual world corresponding to the real-world position of physical object 181. Object monitoring module 151 may monitor an orientation of physical object 181, such as a direction physical object 181 may be facing. In some implementations, object monitoring module 151 may track physical object 181. Tracking may include periodic or continuous monitoring of a position and/or orientation of physical object 181 in a two-dimensional or three-dimensional space. Object monitoring module 151 may monitor and/or track the motion and velocity or change in the motion and the velocity of an object in the real world, such as physical object 181.

Virtual world displaying device 160 may be a projector for projecting virtual world 140 onto display surface 180. Virtual world displaying device 160 may be a light emitting diode (LED) projector, a liquid crystal display (LCD) projector, a digital light processing (DLP) projector, or any other type of projector suitable for projecting a virtual world onto display surface 180. As shown in FIG. 1, virtual world displaying device 160 is located below display surface 180 and underneath physical objects 181a-n are situated. Such a rear-projection arrangement may allow a user or users to interact with physical object 181a-181n without having any shadows interfering with the projection of the virtual world onto display surface 180. Virtual world displaying device 160 may be located above display surface 180 or to a side of display surface 180. In other implementations, virtual world displaying device 160 may display virtual world 140 using a non-projection device, such as an LED or LCD displaying device used in televisions and computer displays.

Augmented reality projector 162 may be a projector for projecting virtual elements of virtual world 140 onto physical objects, such as physical object 181 on display surface 180. In some implementations, augmented reality projector 162 may project the virtual world onto display surface 180. Augmented reality projector 162 may be an LED projector, an LCD projector, a DLP projector, or any other type of projector suitable for projecting an image onto a physical object such as physical object 181. In some implementations, augmented reality projector 162 may be positioned above display surface 180 and physical objects 181a-181n. In some implementations, augmented reality projector 162 may be located to a side of display surface 180.

Monitoring device 170 may be a device suitable for periodically or continuously monitoring and/or tracking physical objects. In some implementations, monitoring device 170 may be a camera, such as a visible-light camera and infrared camera for monitoring and/or tracking physical objects 181. In other implementations, monitoring device 170 may receive information from a device embedded in one or more of a plurality of physical objects 181a-n, such as an accelerometer, a magnetometer, a compass, or other devices that may assist in determining a position, a velocity and/or orientation of physical object 181. Monitoring device 170 may receive such information by a wireless connection. Monitoring device 170 may monitor and/or track a real-world position of physical object 181 and/or a real-world orientation of physical object 181.

Display surface 180 may be a surface suitable for displaying a virtual world, such as a screen or a display. In some implementations, display surface may include a suitable reflective surface on which a virtual world may be projected, such as a translucent display screen for rear-projection or an opaque display screen for conventional image projection, such as front projection. In other implementations, display surface may include a display suitable for displaying a video content, such as a video game or other virtual world. In some implementations, display surface 180 may be a display surface of a television, a computer monitor, or a mobile phone. Display surface 180 may be an LED display, an organic light emitting diode (OLED) display, an LCD display, a plasma display, a cathode ray tube (CRT) display, an electroluminescent display (ELD), or other display appropriate for viewing video content and/or video games. Display surface 180 may be a flat surface, such as a tabletop, on which users may place physical objects 181a-181n.

Each physical object of a plurality of physical objects 181a-181n may be a symmetrical object that may be symmetrical across one axis or two axes, or may be an asymmetrical object. In some implementations, physical object 181 may include fiducial markers, such as retro-reflective tags, to facilitate monitoring and/or tracking. Physical object 181 may include a device to facilitate monitoring and/or tracking, such as a magnetometer, a compass, an inertial sensor such as an accelerometer, or any other device suitable for monitoring or tracking the position or orientation of physical object 181. In some implementations, physical object 181 may communicate monitoring and/or tracking information to monitoring device 170, such as by a wireless connection.

Physical objects 181a-181n may include a surface that is suitable for projection, allowing augmented reality projector 162 to project an image onto physical object 181. In some implementations, physical object 181 may be specific to a certain virtual environment, such as a particular object that may be used in a particular video game, or physical object 181 may be an ordinary object, such as a plate, a spoon, a fork, a knife, a cup, a salt shaker, a pepper shaker, a toy, etc. An ordinary object may be integrated into the augmented reality environment by having a virtual element projected onto the ordinary object, or the ordinary object may be tracked to a real-world position and augmented reality application 150 may insert a corresponding virtual object into the virtual world. For example, a plate may have an image of a virtual ship projected onto the plate using augmented reality projector 162 and may become a steering wheel for navigating a corresponding ship in the virtual world, or an image of a mountain may be projected onto a salt shaker placed on a tabletop using augmented reality projector 162 to represent a mountain in a virtual world shown on display surface 180 by virtual world displaying device 160.

Figure 2:
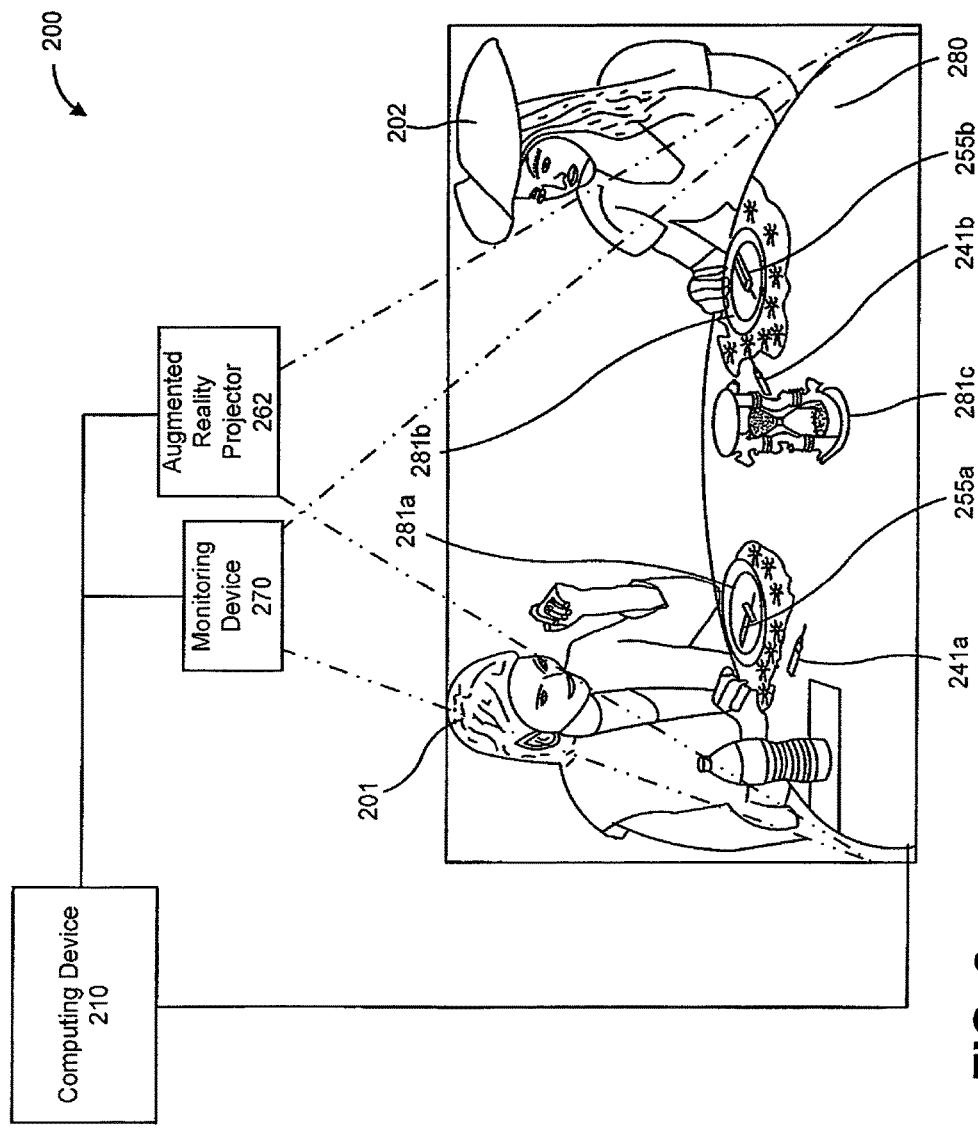
FIG. 2 shows an exemplary environment including the system of FIG. 1, according to one implementation of the present disclosure.

FIG. 2 shows an exemplary environment including the system of FIG. 1, according to one implementation of the present disclosure. Diagram 200 shows computing device 210, augmented reality projector 262, monitoring device 270, and tabletop 280 used as display surface 180 on which virtual world displaying device 160 displays an initial configuration of a video game, including virtual element 241a and virtual element 241b. Virtual world 140 of FIG. 2 is displayed using rear-projection or display onto tabletop 280, such that there are no shadows. On top of tabletop 280, a plurality of physical objects 281 are shown, such as plate 281a, plate 281b, and hourglass 281c. Augmented reality projector 262 is located above tabletop 280, e.g. in the ceiling of the room, and projects user control projection 255a onto plate 281a, and user control projection 255b onto plate 281b.

User control projection 255a is an image of a ship that is a virtual representation of virtual element 241a, and user control projection 255b is an image of a ship that is a virtual representation of virtual element 241b. Furthermore, user control projection 255a is correlated with virtual element 241a, and user control projection 255b is correlated with virtual element 241b, where the user control projections 255a and 255b are correlated with virtual elements 241a and 241b, respectively, by having the same orientation as virtual elements 241a and 241b. The correlation between user control projections 255 and virtual elements 241 may enable each user to interact with system 100 and easily identify the virtual element which the user controls. For example, user 201 is made aware of which ship user 201 controls by the visual correlation between user control projection 255a and virtual element 241a, and may easily be able to control virtual element 241a by orienting user control projection 255a in the same direction that user 201 wishes virtual element 241a to point.

In some implementations, user control projection 255a may represent a virtual element from the virtual world, or user control projection 255a may transform a physical object 181 into a user control interface. For example, user control projection 255a may be an image of a steering wheel projected onto a plate, thereby transforming the plate into a steering wheel that may be used to steer a virtual vehicle in the virtual world. User control projection 255a may also include virtual user interface components, such as virtual buttons, virtual triggers, virtual sliders, or other virtual controls for receiving user input.

Figure 3:
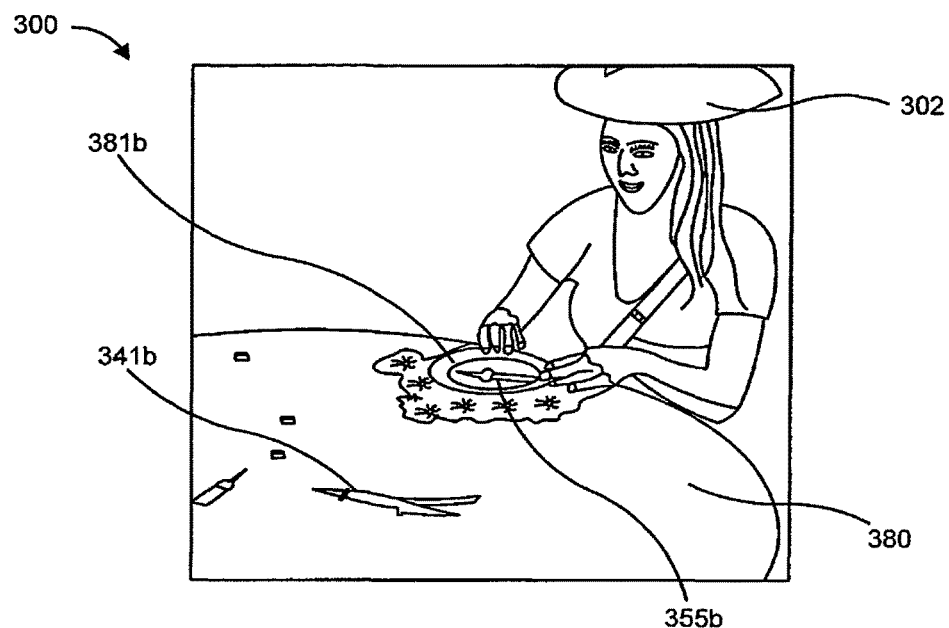
FIG. 3 shows an exemplary environment including the system of FIG. 1, according to one implementation of the present disclosure.

FIG. 3 shows an exemplary environment including the system of FIG. 1, according to one implementation of the present disclosure. Diagram 300 depicts user 302 playing a video game. Tabletop 380 depicts the virtual world including virtual element 341b moving through the virtual world, as indicated by the wake trailing behind virtual element 341b. User control projection 355b, projected on plate 381b, correlates with virtual element 341b. In some implementations, the correlation between virtual element 341b and user control projection 355b may be direct, or the correlation may be relative. For example, virtual element 341b may be a ship that user 302 navigates through the virtual world using plate 381b. As user 302 rotates plate 38b to steer the ship, user control projection 355b may be directly correlated to the ship in that the orientation of user control projection 355b as projected onto plate 381b by augmented reality projector 162 may match the orientation of the ship in the virtual world. In such an implementation, if user 302 rotates plate 381b through a 180° turn, the ship will turn 180° in the virtual world, and user control projection 355b, as projected onto plate 381b by augmented reality projector 162, will rotate 180° in the same direction as the ship turns and in the same direction that user 302 turned plate 381b.

Alternatively, when the correlation between virtual element 341b and user control projection 355b is relative, user control projection 355b may indicate that user 302 is turning plate 381b without matching the orientation of the ship in the virtual world. For example, user 302 may rotate plate 381b through a 180° turn to user 302's right, and user control projection 355b may turn 30° to the right to indicate to user 302 that the ship is turning right, or user 302 may rotate plate 381b through a 180° turn to user 302's left, and user control projection 355b may turn 30° to the left to indicate to user 302 that the ship is turning left.

Figure 4:
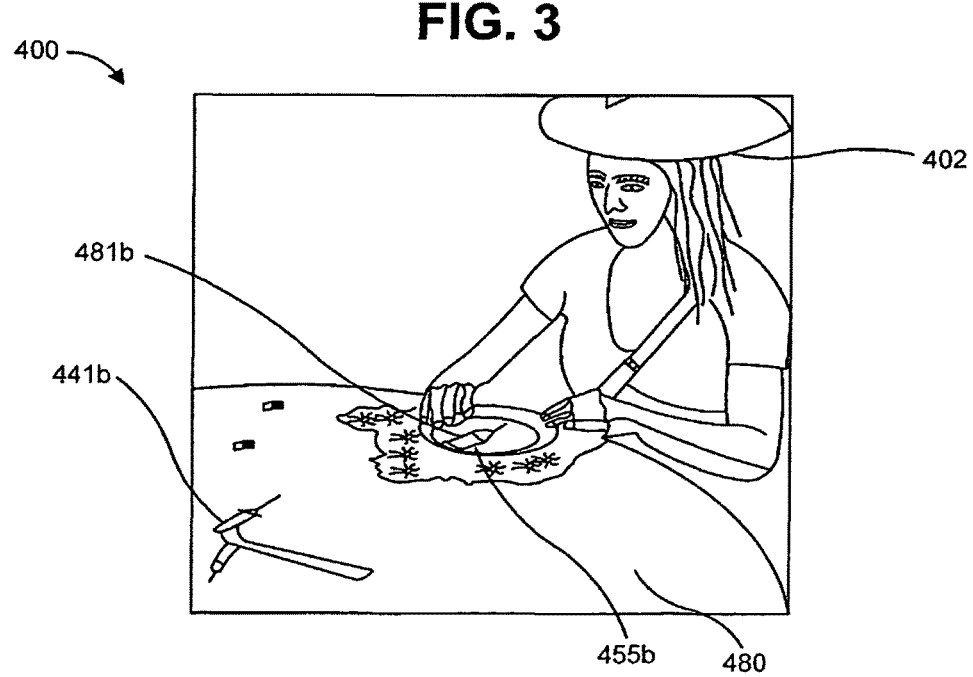
FIG. 4 shows an exemplary environment including the system of FIG. 1, according to one implementation of the present disclosure.

FIG. 4 shows an exemplary environment including the system of FIG. 1, according to one implementation of the present disclosure. Diagram 400 shows user 402 playing the video game as a continuation of the scene shown in FIG. 3. User 402 is shown turning plate 481b, with user control projection 455b projected onto plate 481b. Virtual element 441b is shown moving through the virtual world projected onto tabletop 480. As user 402 turns plate 481b to control virtual element 441b, user control projection 455b is updated such that the visual representation of user control projection 455b and virtual element 441b in the virtual world remain correlated. In some implementations, plate 455b may include fiducial markers so that monitoring device 170 may track manipulation of plate 455b by user 402. Monitoring device 170 may monitor and track a position and/or orientation of plate 455b for use as a control input to control virtual element 441b. For example, augmented reality application 150 may receive monitoring and/or tracking data for plate 481b using monitoring device 170. Based on the monitoring and/or tracking data, augmented reality application 150 may use virtual world displaying device 160 to update the virtual world, and augmented reality projector 162 to update user projected control 455b by projecting an updated image onto plate 481b, the updated image corresponding to updated virtual element 441b.

Figure 5:
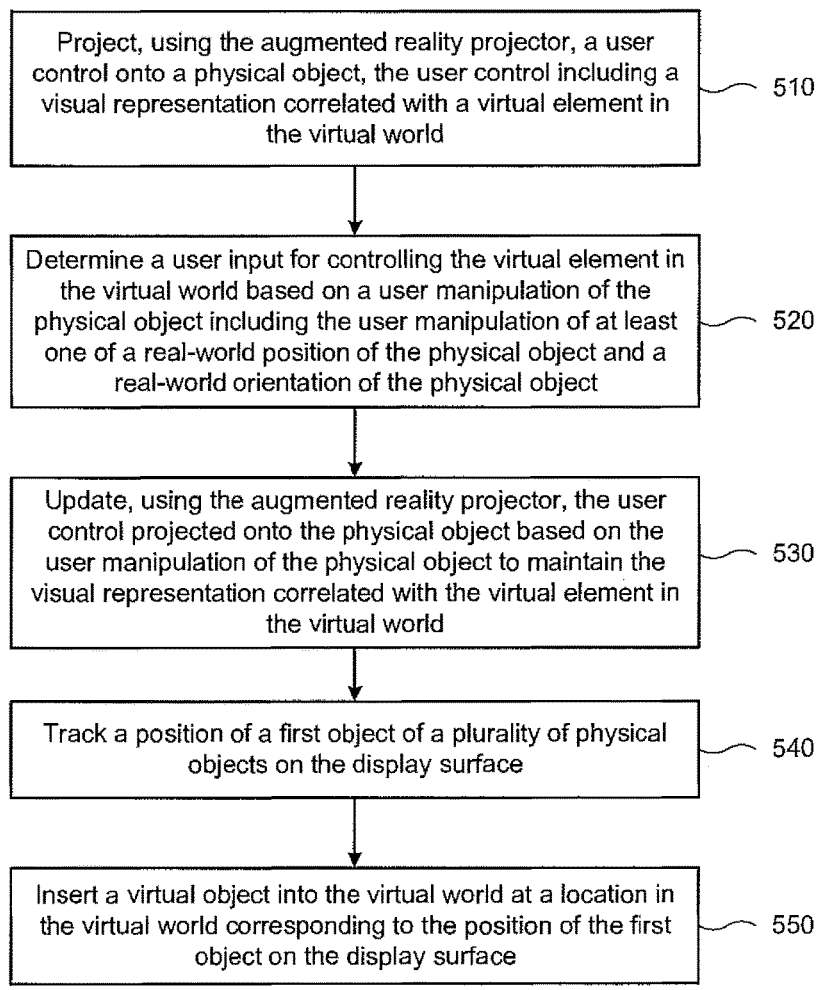
FIG. 5 shows a flowchart illustrating an exemplary method of providing augmented reality controls for user interactions with a virtual world, according to one implementation of the present disclosure.

FIG. 5 shows an exemplary flowchart illustrating a method of providing augmented reality controls for user interactions with a virtual world, according to one implementation of the present disclosure. Flowchart 500 begins at 510, where system 100 projects, using augmented reality projector 162, a user control onto physical object 181, the user control including a visual representation correlated with a virtual element in virtual world 140. In some implementations, system 100 may project a plurality of user controls onto a corresponding plurality of physical objects 181a-181n. The visual representation correlated with a virtual element may look the same as the virtual element, for example, the virtual element may be a ship sailing through the virtual world collecting treasure, and the user control visual representation may be an image of the ship. In other implementations, the visual representation may include an identifiable element of the virtual element and not an image of the virtual element. For example, the virtual element may be a racecar, and the user control visual representation may be the racecar number projected onto physical object 181. In some implementations, the visual representation may look the same as the virtual element, have a same or similar color scheme or pattern as the virtual element, or otherwise include elements that make clear to the user which virtual element may be controlled using physical object 181.

The visual representation projected onto physical object 181 may be correlated to the virtual element, which is controlled by the user, to enhance the user interaction with system 100 for navigation through the virtual world. In some implementations, the visual representation projected onto physical object 181 may have the same orientation as the virtual object. For example, physical object 181 may be a dinner plate for use steering a ship as it navigates through a sea in virtual world 140, and the visual representation may be an image of the ship. To navigate the ship, the user may turn the plate to steer the ship. As the ship turns in the sea, the visual representation projected onto the plate may maintain the same orientation as the virtual element, enabling the user to identify the ship quickly, and have feedback about the ship, namely the direction the ship is going, by looking at the visual representation projected on the plate.

At 520, system 100 determines a user input for controlling the virtual element in virtual world 140 based on a user manipulation of physical object 181 including the user deforming of physical object 181, and/or the user manipulation of at least one of a real-world position of physical object 181 and a real-world orientation of physical object 181. Deforming of physical object 181 may include, for example, a user bending physical object 181, squashing physical object 181, or stretching physical object 181. In some implementations, a user may interact with or manipulate physical object 181 to control the virtual element, for example, to play a video game. User interaction with physical object 181 may include the user sliding physical object 181, turning physical object 181, lifting physical object 181, touching physical object 181. In some implementations, user interaction with physical object 181 may include the user touching a virtual control that is projected onto physical object 181, such as operating a virtual button, operating a virtual trigger, or operating a virtual slider. Augmented reality application 150 may be trained to identify various physical objects that are included in physical objects 181a-181n. In some implementations, augmented reality application 150 may be trained on a plurality of objects that are included in physical objects 181a-181n and configured to identify the physical objects as virtual objects in the virtual world. Some objects that are included in physical objects 181a-181n may include identifying markers or may include fiducial markers, such as retro-reflective tags, to enable augmented reality application 150 to uniquely identify a position and/or orientation of each object that is included in physical objects 181a-181n.

Augmented reality application 150 may monitor the position and/or orientation of each object of physical objects 181a-181n by sampling each object's position and/or orientation using monitoring device 170. Augmented reality application 150 may detect a change in position and/or orientation of an object of physical objects 181a-181n and track the change in position and/or orientation of the physical object of physical objects 181a-181n. Augmented reality application 150 may be trained on the configuration of display surface 180, i.e., augmented reality application 150 may be calibrated to determine a distance between two points on display surface 180. When augmented reality application 150 detects a change in position and/or orientation of an object of physical objects 181a-181n, augmented reality application 150 may determine the distance between the initial position/orientation, and based on the sampling information, determine a direction of the motion, and/or a velocity of the motion. In some implementations, augmented reality application 150 may receive monitoring and/or tracking data from monitoring device 170, update the virtual world using virtual world displaying device 170, and update the augmented reality using augmented reality projector 162, based on the monitoring and tracking data.

System 100 may determine the user input for controlling the virtual element by tracking the interaction or manipulation of physical object 181. In some implementations, the user input may correspond to a change in the real-world position of physical object 181, or the user input may correspond to a change in the real-world orientation of physical object 181. The manipulation of physical object 181 may directly or indirectly correlate to the desired action of the ship in the real world. For example, when the user is using a plate to navigate a ship through the virtual world, the user may turn the plate to turn the ship as it sails, effectively using the plate as a steering wheel. Accordingly, a change in the real-world orientation of the plate may turn the ship in the virtual world. Similarly, a user may control a video game by changing the real-world position of physical object 181. To monitor and/or track the real-world location and real-world orientation of physical object 181, system 100 may use computer vision. Monitoring device 170 may be an infrared camera and may monitor and/or track physical objects 181a-181n using unique infrared markings or tags on each physical object 181a-181n.

Additionally, augmented reality projector 162 may project virtual elements onto some or all of physical objects 181a-181n. The virtual world may become more interactive when physical objects 181a-181n in the real world becomes a part of the virtual world. Similarly, augmented reality application 150 may be calibrated to recognize physical object 181 as a virtual object. For example, augmented reality application 150 may incorporate a training phase during which a user may be asked to select one of physical objects 181a-181n to represent a sword in the virtual world. The user may select a knife from the table setting and place the knife in a designated location on display surface 180, and augmented reality application 150, using a camera or other monitoring device 170, may learn the object and incorporate the knife as a sword in the virtual world. In other implementations, augmented reality application 150 may be trained on one or more of physical objects 181a-181n, allowing augmented reality application 150 to identify those objects without an additional training step.

At 530, system 100 updates, using augmented reality projector 162, the user control projected onto the physical object based on the user manipulation of the physical object to maintain the visual representation correlated with the virtual element in the virtual world. As the user manipulates physical object 181 to control the virtual element, physical object 181 may change position, orientation, or both position and orientation. In order to maintain the correlation with the virtual element, the system 100 may project an updated visual representation of the virtual element projected onto physical object 181 to reflect any change in orientation of the virtual element, and compensate for any change in location of physical object 181.

At 540, system 100 tracks a position of a first object of a plurality of physical objects on the display surface. In some implementations, physical objects 181a-181n may include a physical object 181 that may not be used for user control input. For example, when display surface 180 includes a tabletop on which plates are used to steer ships through a virtual world, silverware and condiments may also be placed on the tabletop. In some implementations, system 100 may monitor and/or track these other physical objects. Additionally, system 100 may determine a position in the virtual world corresponding to the real-world position of each physical object 181a-181n.

At 550, system 100 inserts a virtual object into the virtual world at a location in the virtual world corresponding to the position of the first object on the display surface. Physical objects 181a-181n may be used to create objects and/or obstacles in the virtual world. For example, when in the virtual world is an ocean through which the user navigates a ship, a salt shaker may be placed at a location on the tabletop, and system 100 may insert a mountain or island into the virtual world at a location corresponding to the real-world position of the salt shaker.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
    a display surface;
    a virtual world displaying device located below the display surface and configured to display a virtual world on the display surface;
    a physical object located above and on the display surface;
    an augmented reality front-projector located above the display surface and the physical object;
    a memory storing an augmented reality software program; and
    a processor executing the augmented reality software program to:
        project, using the augmented reality front-projector, a user control projection onto the physical object, the user control projection correlated with a virtual element in the virtual world being displayed on the display surface;
        determine a user input for controlling the virtual element in the virtual world based on a user manipulation of the physical object having the user control projection thereon;
        update, using the augmented reality front-projector, the user control projection projected onto the physical object based on the user input to maintain the user control projection correlated with the virtual element in the virtual world.

2. The system of claim 1, wherein the user manipulation of the physical object includes at least one of deforming of the physical object, a manipulation of a real-world position of the physical object, and a manipulation of a real-world orientation of the physical object.

3. The system of claim 1, further comprising a plurality of physical objects on the display surface, wherein, prior to the projecting, a user selects the physical object from the plurality of objects on the display surface.

4. The system of claim 1, further comprising a plurality of physical objects on the display surface, wherein the processor is further configured to:
- track a position of a first object of the plurality of physical objects on the display surface; and
- insert a virtual object into the virtual world at a location in the virtual world corresponding to the position of the first object on the display surface.

5. The system of claim 1, further comprising a plurality of physical objects on the display surface, wherein the augmented reality front-projector projects one or more virtual elements of the virtual world onto each of the plurality of objects.

6. The system of claim 1, wherein the user control projection includes a virtual user interlace having at least one of a virtual button, a virtual trigger, and a virtual slider.

7. The system of claim 1, wherein the user manipulation of the physical object is tracked using one of a compass, a magnetometer, an inertial sensor, and a camera.

8. The system of claim 1, wherein the user control projection is a steering wheel.

9. A method for use with a system having a display surface, a virtual world displaying device, an augmented reality front-projector, a physical object, a memory, and a processor, the method comprising:
- displaying, using the virtual world displaying device located below the display surface, a virtual world on the display surface;
- projecting, using the augmented reality front-projector located above the display surface and the physical object, a user control projection onto the physical object, the user control projection correlated with a virtual element in the virtual world being displayed on the display surface;
- determining, using the processor, a user input for controlling the virtual element in the virtual world based on a user manipulation of the physical object having the user control projection thereon; and
- updating, using the augmented reality front-projector, the user control projection projected onto the physical object based on the user input to maintain the user control projection correlated with the virtual element in the virtual world.

10. The method of claim 9, wherein the user manipulation of the physical object includes at least one of deforming of the physical object, a manipulation of a real-world position of the physical object, and a manipulation of a real-world orientation of the physical object.

11. The method of claim 9, further comprising a plurality of physical objects on the display surface, wherein, prior to the projecting, a user selects the physical object from the plurality of objects on the display surface.

12. The method of claim 11, wherein the processor is further configured to:
- track a position of a first object of the plurality of physical objects on the display surface; and
- insert a virtual object into the virtual world at a location in the virtual world corresponding to the position of the first object on the display surface.

13. The method of claim 9, further comprising a plurality of physical objects on the display surface, wherein the augmented reality front-projector projects one or more virtual elements of the virtual world onto each of the plurality of objects.

14. The method of claim 9, wherein the user control projection includes a virtual user interface having at least one of a virtual button, a virtual trigger, and a virtual slider.

15. The method of claim 9, wherein the user manipulation of the physical object is tracked using one of a compass, a magnetometer, an inertial sensor, and a camera.

16. The method of claim 9, wherein the user control projection is a steering wheel.

* * * * *